April 13, 1937.　　J. W. POOLE　　2,077,057
APPARATUS FOR SOLVENT REFINEMENT OF HYDROCARBONS
Filed Sept. 21, 1934　　3 Sheets-Sheet 2

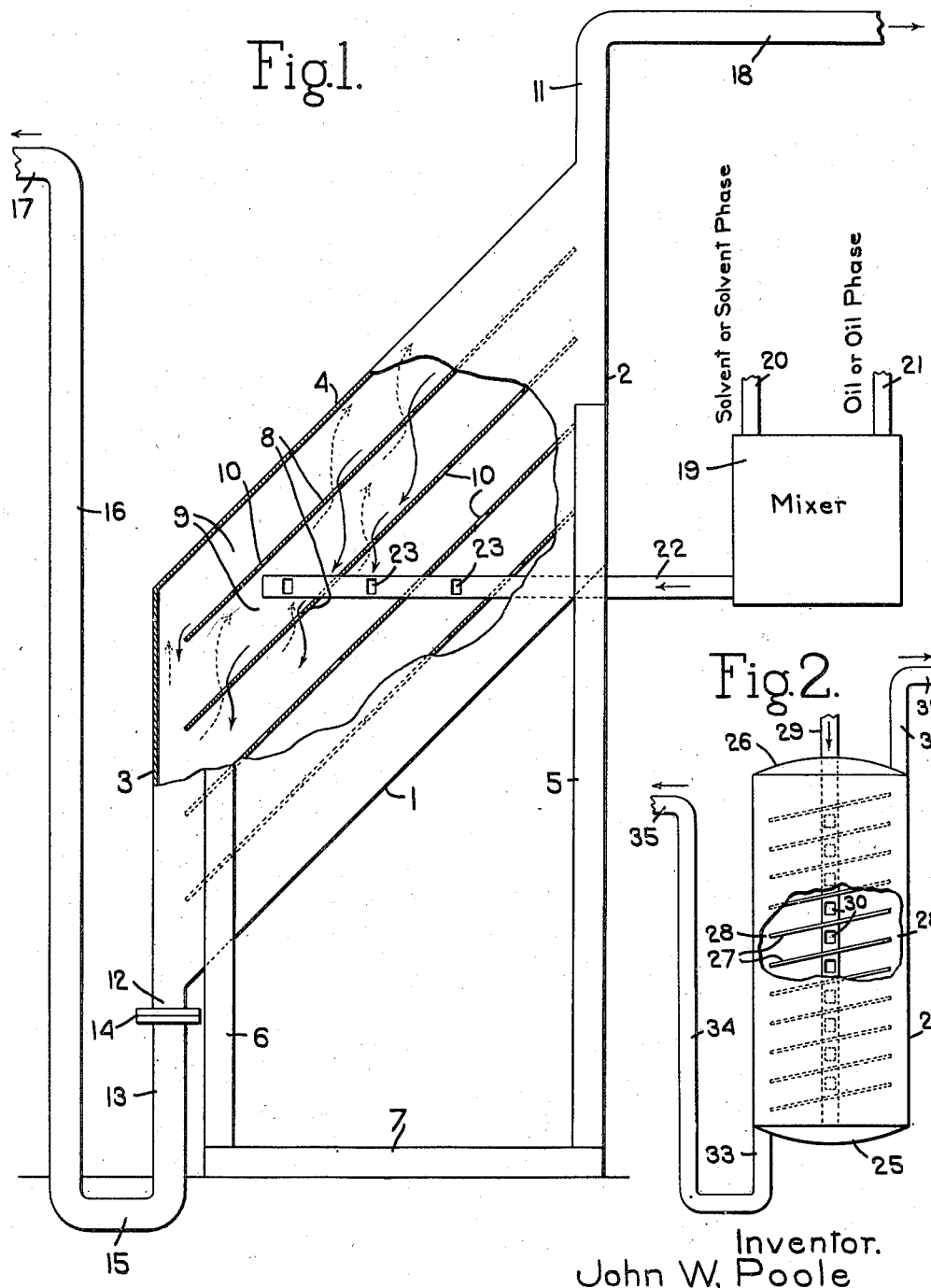

Inventor.
John W. Poole
by Heard Smith & Tennant.
Attys.

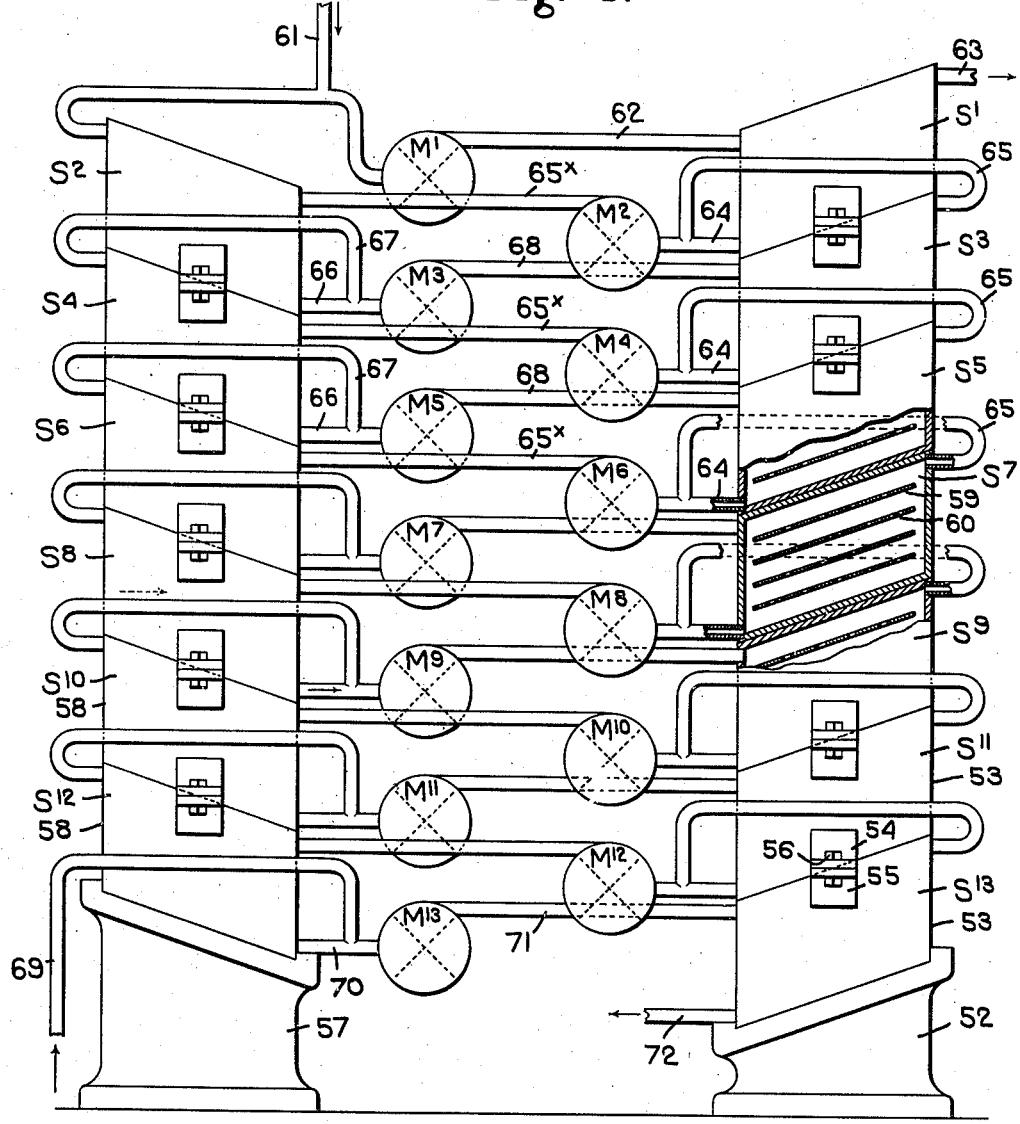

Patented Apr. 13, 1937

2,077,057

UNITED STATES PATENT OFFICE 2,077,057

APPARATUS FOR SOLVENT REFINEMENT OF HYDROCARBONS

John W. Poole, Jaffrey, N. H.

Application September 21, 1934, Serial No. 744,874

18 Claims. (Cl. 196—13)

This invention relates to improvements in apparatus for use in processes of solvent extraction of mixtures of hydrocarbons and/or hydrocarbon derivatives, and the general object of the invention is to provide mechanism for more rapidly and effectively separating the oil phase and the solvent phase, thereby speeding up production.

A further object of the invention is to provide an apparatus of the character above described smaller in size but equal in capacity to previous types of apparatus and which can be easily and economically constructed.

In the present disclosure the term "hydrocarbons" is employed in a broad sense as defining not only hydrocarbons but compounds derived from hydrocarbons, such as asphalts, asphaltenes, and hydrocarbon derivatives containing sulphur, nitrogen, etc.

As is well known, any process of solvent extraction as at present practised comprises two important steps which are directly opposite in nature each from the other. Primarily solvent extraction is practised by thoroughly mixing the solvent used with the material to be extracted in order to attain as near as possible to the conditions of equilibrium, i. e. in order to attain as nearly as possible to the maximum extractive efficiency of the solvent used. Subsequent to this step the mixture is separated either by settling and decantation or by other means such as centrifuging. In general, centrifuging and gravity settling comprise the two most important methods of effecting such separation. This separation should be complete and definite in order that the process may operate at its maximum efficiency. In general, any solvent process will be operated by a succession of stages such as described above, wherein flow of solvent and the material to be processed is maintained countercurrent. However, regardless of the sequence of steps, the efficiency of the process depends on the efficiency of the steps of successively mixing and separating.

With many solvents the step of separating the two phases which co-exist in the material passing from the mixing stage to the separation stage is so slow that settling chambers of extreme size or separation by centrifuge is necessary. From my experiments and observations, I have discovered that settling is roughly proportional to the distance through which globules of the separating phases must settle. For example, settling through a twelve inch column of material will be accomplished in roughly one-half the time as would settling through a twenty-four inch column, although, due to a slight degree of coagulation of particles during their passage through the mixture, a slight tendency does exist to decrease the time required over that indicated by the inverse ratio of the settling distance.

One of the principal objects of the present invention is to provide a novel settling chamber for use in solvent extraction in which, if necessary, the effect of considerable height of column necessary to produce sharp delineation between the solvent phase and the oil phase is preserved and at the same time to provide means for producing the effect of short settling distances for the particles to be separated and coagulated from the mixture entering the separating chamber.

I have discovered that the rate of coagulation, which is slow during the actual settling period, takes place readily when two particles of the same phase become superimposed upon each other, so that by virtue of their weight, coagulation thereof is enforced. In other words, providing the heavier material in the dispersed phase coagulation is found to take place mainly at the bottom of a settling chamber after the individual globules have settled through the dispersing medium. Furthermore, it is well known that as globules increase in size because of coagulation, settling is increased in speed.

A further object of the invention is to provide an apparatus comprising a series of mixers for the hydrocarbon and solvent and a complementary series of settling chambers of the character above described embodying the invention through which solvent extraction of the hydrocarbon mixture may be progressively effected and countercurrent flow of the respective phases maintained by gravitational force, thereby to simplify the plant, to reduce the expense of installation, and to render the process of solvent extraction more profitable.

Illustrative apparatus embodying the invention is shown in the accompanying drawings, in which:

Fig. 1 is a view, partly in vertical section, of a preferred form of settling chamber embodying the invention;

Fig. 2 is a view of a modified form of settling chamber, a portion of the outer wall of which is broken away;

Figure 3:
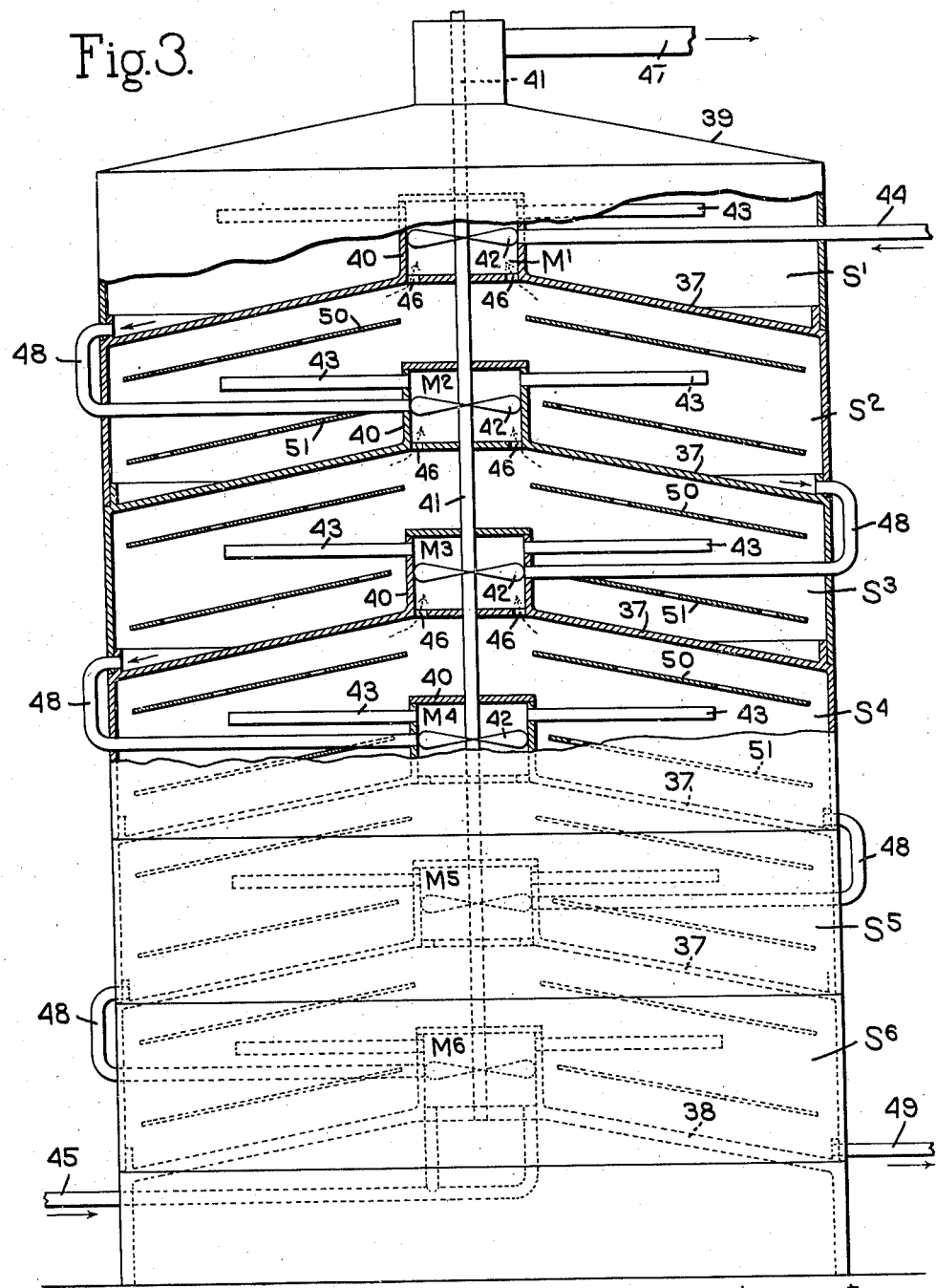

Fig. 3 is a view, partly in vertical section, illustrating an apparatus providing a complete extraction plant in a single upright vessel, in which a vertical series of settling tanks of the character above described are provided with mixers complementary to each settling chamber drawing heavy material from the settling chamber next above and light material from the settling chamber next below; and Fig. 4 is a view, partly in section, of an apparatus comprising two vertical series of settling chambers with mixers associated with each of the chambers of one series, drawing heavy material from the lower portion of one chamber and light material from the top chamber therebeneath and discharging it into a complementary settling chamber of the other series, thus providing a separation plant of relatively low height, but of large capacity.

In the commercial practice of solvent separation it is common practice to utilize vertical settling tanks of sufficient dimensions to secure approximately complete settling of the two phases and ordinarily such tanks are constructed to vertical height of several feet, so that the settling particles must pass several feet through the mixture contained in the tank.

One of the principal objects of the present invention, as heretofore pointed out, is to provide a novel settling tank for use in solvent extraction in which the effect of considerable height of column necessary to produce sharp delineations between the solvent phase and oil phase is preserved, but will produce satisfactory separation of the phases by short settling distances for the heavier particles, with means for aiding coagulation of the heavier particles.

Preferred forms of settling tanks adapted to perform this function are illustrated in the accompanying drawings.

The construction illustrated in Fig. 1 comprises a settling chamber, preferably longitudinally in the form of a parallelogram, and of rectangular cross section, having a base 1 which is inclined to the horizontal, vertical ends 2 and 3, and a top 4, inclined to the horizontal in substantial parallelism with the bottom 1. The settling tank may be made of any suitable material and supported upon suitable columns 5 and 6 from a base 7. A series of baffle walls 8 extend in parallelism to the lower and upper walls 1 and 4 and terminate short of the ends of the chamber, thereby dividing the chamber longitudinally into a series of compartments 9 which are intercommunicating at their upper and lower ends with the chamber and with each other. These baffle walls or partitions desirably are provided with essentially horizontal slots 10 staggered in respect to those in adjacent partitions in such manner as to prevent short circuiting of the material flowing from one compartment to another.

The upper end of the settling chamber is provided with an outlet conduit 11 which may consist of a standard pipe of suitable diameter to permit the unrestricted flow of the light phase after separation from the mixture. At the bottom of the chamber is located a similar outlet 12 through which the heavy material is discharged from the separating chamber. Desirably a standard pipe 13 of suitable diameter is connected to the outlet 12 by a suitable coupling 14 and extends downwardly to or below the base of the machine where it is connected with a horizontal pipe 15 which in turn is connected to a vertical pipe 16 of sufficient length to form in conjunction with said separating chamber a so-called U-bend separator. The outlet 17 of the pipe 16 is arranged at such height in respect to the outlet 18 of the pipe 11 as to afford essentially automatic and independent discharge of the two phases.

The hydrocarbon and solvent phases introduced to a mixer 19 through pipes 20 and 21 are so dispersed by rapid agitation that there will be produced droplets of sufficient fineness to permit of rapid and easy extraction. The mixture is fed from the mixer through a pipe 22 which extends across the mixing chamber and is delivered to the various compartments therein through suitable orifices 23 communicating with the several compartments intermediate of their lengths.

Upon leaving the orifices 23 the mixture is shortly reduced in velocity to a sufficient degree to eliminate turbulence at which point settling begins. Assuming that the oil phase constitutes the heavier of the two phases to be separated, the path of the oil, which is indicated by solid line arrows, will then be as follows:—

Issuing horizontally through the orifice 23 the particle having become reduced below the point of turbulence will settle downwardly until it comes in contact with another particle or particles on the baffle wall 8. This coagulated material will then flow downwardly until it reaches the upper edge of a slot 10. It then passes downwardly as indicated by arrows to another baffle wall, thence downwardly on the baffle wall to another slot and so on until it reaches the outlet conduit 13. At each successive lower baffle wall there is a tendency to encounter other material of a similar nature and with the resulting effect that further coagulation will occur upon the baffle walls and settling by reason of the increased size of the drops, will become progressively easier and more rapid. The effect of these partitions is to reduce the vertical distance through which any individual oil particle must travel before it comes into contact with another particle in such a manner as to induce coagulation and by reason of increased particle size resulting from this coagulation, will continue to settle with increased rapidity.

The slots 10 in the baffle walls perform valuable service in the processing of certain types of stock. I have found that an oil phase which results from the mixing of a selected solvent with a petroleum fraction suitable for lubricating oil manufacture, which comprises high percentages of wax, will possess considerable structural strength at the temperatures of operation. It is not unusual to encounter waxy charging stocks possessing pour points as high as 110-degrees F. In consequence, at temperatures appreciably below the pour point, the waxy material in the oil phase will tend to impart such a high degree of tensile strength to the oil phase, that globules of solvent will be mechanically held within the oil phase, and provided no agitation of this phase takes place or no expressive forces are applied greater than the difference in gravity of the two phases, this mechanically restrained solvent phase will remain permanently held within the oil phase. Where the oil phase flows through the slots 10 this mechanically held material is largely worked out of the oil phase and allowed to rejoin other portions of the solvent phases which are flowing upwardly through the separator. The action by which this material is released is that of disruption of the waxy structure by passing over the edge of the slot. The change in direction of flow at this point may be described as similar to the bending of a bar of material and results in rupture of the upper surface of the waxy material which encloses the globules of solvent, thereby releasing it from confinement and permitting it to pass freely upwardly.

The passage of the solvent phase, which by assumption is the lighter phase, and which is indicated by broken line arrows, is in reality considerably more simple than that of the oil phase. In the first place, there is very little in the way of a coagulation problem. Except for the mechanically restrained globules of solvent previously mentioned, the solvent phase is in general continuous throughout and will flow freely from one portion of the settling chamber to any other, and as more material is charged to the settling chamber, it will continuously flow between particles of oil phase upwardly and out through the conduit 11 to the outlet 18 thereof. However, the baffle walls or partitions 8, the utility of which has been previously discussed, in respect to the oil phase, also serve a desirable purpose with respect to the solvent phase. A typical portion of solvent phase will pass, upon issuance from an orifice 23, in an upward direction until it reaches a zone existing along the under part of each baffle wall 8 through which such material will then flow freely. The baffle walls or partitions therefore serve to prevent the solvent phase from tending to re-mix and interfere with the flow of such oil droplets as have been carried to points higher in the settling chamber, but which have by this time started to coagulate and to descend, as heretofore described.

It has been found that the shape of the passages or channels through which separated or partially separated oil or solvent phase is to flow is an important factor in the efficiency and capacity of the apparatus. Desirably these passages should be straight, at least until flow of the phase in question has carried the material comprising that phase to a point in the apparatus where none of the other phase is present. It has been found that if these passages can be made straight or nearly so turbulence is reduced over that which would occur in a tortuous or curved channel. With phases that differ comparatively little in density the greater efficiency of an apparatus with straight passageways over one with curved walls can be considerable. An explanation of this fact can be found by considering the mechanics involved:—For example, in Fig. 1 the space between the vertical wall or end 3 and the terminals of the baffle walls 8 constitutes the passageway for the downward flow of the heavier phase. However, except near the bottom portion both phases will to some extent inevitably coexist within this channel, the quantity of the lighter phase steadily increasing the higher is the actual point within this channel. At a point above mid-height, the compartments 9 (even that portion of the compartment adjacent to the channel) tend to contain more of the lighter phase than of the heavier phase; furthermore, this channel is in effect two channels which may be termed "major" and "minor" channels, although these two channels are not physically separated by a partition. The major channel is that through which the heavier material flows downwardly and occupies the space between end 3 and baffle 8 which adjoins the latter. The other or minor channel acts as a scavenger for small amounts of lighter phase. Near the bottom it fades away to negligible importance; higher up, flow may even be greater through it than through the adjoining portion of the major channel. Conditions are analogous at the opposite side of the apparatus except conditions are inverted. It will be apparent, therefore, that any turbulence in these passageways, the exterior walls of which are supplied by ends 2 and 3, will be most undesirable and tend to defeat separation by destruction of the minor channels, the substance of which then becomes merely an "adulterant" of the material flowing in the major channel. Furthermore, a turbulent condition set up in these areas has been found to transmit itself into adjacent portions of the compartments 9, so that they in turn deliver material to the passageways which is less efficiently separated. In consequence, I have found it very desirable to avoid channels the walls of which are curved with respect to the line of flow. In practice therefore the convenient method of accomplishing this result is to use vessels having straight vertical walls.

By the use of this invention I have been able to produce in a settling chamber of greatly reduced size for a given capacity, solvent phase of purity equal to that which is generally produced by the use of settling chambers having a volumetric hold-up in excess of twice the hold-up possessed by the apparatus utilizing my invention. Furthermore, when processing a waxy stock, the oil phase issuing from the settling chamber embodying the present invention tends to be more free of mechanically held solvent phase than does similar material issuing from a conventional type of gravity separator.

In such instance, as the hydrocarbon charge to an extraction plant does not contain appreciable quantities of waxy and high melting substances, the use of slots in the partitions may be dispensed with. For example, in Fig. 2 is shown a settling chamber utilizing my invention which comprises a tubular, preferably cylindrical, shell 24 having a bottom 25, and top 26, and provided with narrowly spaced imperforate baffles 27 which in the plane shown do not extend the full width of the tubular shell 24, thereby providing a series of compartments communicating with vertical channels 28 between the ends of the baffles or partitions and the shell 24. The mixture to be separated may be introduced through a pipe 29 having orifices 30 communicating with the several compartments defined by the partitions 27.

A pipe 31 leading from the upper end of the settling chamber is provided with an outlet 32 to discharge the lighter phase and a pipe 33 communicating with the lower end of the chamber serves to discharge the heavier phase. The pipe 33 has a vertical section 34 provided with an outlet 35 so arranged with respect to the height of the outlet 32 as to afford essentially automatic and independent discharge of the two phases, as above described.

By reason of the greatly decreased time necessary for settling in the improved settling chamber above described, the volume of the settling chamber may be radically reduced. Because of this fact it is possible to construct and operate an extraction plant of new and compact design, for example an apparatus of the so-called "tower" type, but which is free of the fundamental deficiencies to which such apparatus has heretofore been subject.

As has previously been stated, the two steps of mixing and settling are completely antithetical with respect to their accomplishments. In the case of one, turbulence is necessary. In the case of the other, turbulence is detrimental. It is then evident that to attempt to bring about the two steps,—mixing and settling—within a common chamber, is inconsistent, and that if conditions ideal for the accomplishment of one step are maintained, that of the other step will be impossible of accomplishment. Furthermore, any compromise from one ideal condition, to an intermediate state of turbulence, will result in a corresponding detriment to the other condition, and in consequence neither operation may take place at its maximum efficiency. Such a state of compromise is that which exists in the so-called extraction columns or towers as now operated. In such columns the heavier of the two materials, solvent and oil, is admitted near the top of an upright vessel, the lighter material being admitted near the bottom. In consequence, the two materials will tend to pass through the vessel in opposite directions, being so impelled by virtue of the difference in their respective densities. Such movement, may be reasonably rapid provided no great degree of turbulence exists in the system. However, in order that the first of the two steps, mixing to effect transfer of extracted material to the solvent, may be accelerated, it is customary to introduce a degree of turbulence by means of mixing devices. In short, a condition is established which is inconsistent both with efficient mixing and efficient settling in that turbulence must be comparatively low to allow some settling, and in consequence must be too low to cause the most efficient and speedy diffusion, therefore the efficiency of the process as a whole suffers in each of its essential steps.

In usual practice, this failure to attain a high efficiency is compensated for by increasing the length of the paths through which each phase must flow. Although by such lengthening it is theoretically possible to eventually attain a length of path which will give the same efficiency as would be produced in a smaller unit, in which complete efficiency of solvent was developed, such increase results in increased volume of solvent continuously held in the system and due to the comparatively high price of solvents, results in increased capital and operating costs. Furthermore, it may also result in the use of unnecessarily large volumes of solvent which must later be recovered by distillation and consequent consumption of energy.

I have discovered that by dividing such an extraction tower into definite mixing and settling zones, in which neither of the two steps,—mixing and settling—may interfere with the operation of the other, that it is possible to greatly increase the efficiency of such towers and thereby correspondingly to reduce their size to effect the same degree of extraction. To accomplish this result and to secure complete countercurrent flow, one phase is bypassed from the settling stage around the corresponding mixing stage. This constitutes an important feature of the present invention. An illustrative embodiment of the invention in which the length of the tower is reduced by the employment of settling chambers of the character above described is shown in Fig. 3 and comprises a preferably cylindrical shell 36 having therein a superimposed series of settling chambers S1, S2, S3, S4, S5, S6, which may be formed by conoidal partitions 37 which form the base of one settling chamber and the top of the chamber below. The lowermost chamber has a corresponding conoidal base 38 of much heavier material as it necessarily supports all of the liquid of the several chambers. The top 39 of the uppermost chamber S1, likewise desirably is of conoidal form and spaced the same distance from the bottom of said chamber as the spacing of the tops and bottoms of the other chambers.

The central portions of the base 38 of the separating chambers and the partitions 37 desirably support the casings 40 of suitable mixing chambers M1, M2, M3, M4, M5, M6, and a vertical shaft 41 extending axially through the mixing chambers is provided with suitable vanes 42, preferably disposed at such angles to the horizontal as will propel the liquid in the mixing chamber gently upwardly. Distributing conduits 43 extend outwardly from the upper portions of the mixing chamber to such distance as to discharge the material from the mixing chamber approximately midway of the radius of the settling chambers.

The heavy material is supplied through a pipe 44 to the mixer M1, from which it is forced through the pipe 43 into the settling chamber S1. The light material is introduced through the pipe 45 into the lower mixing chamber M6 in which it is mixed with heavy material taken from the next higher settling chamber S5. The mixture of light and heavy material is discharged from the mixer M6 through the outlet pipe 43 into the settling chamber S6 where the lighter material rises to the top and enters the mixing chamber M5 while the heavy material is discharged through the outlet 49.

The bottom of each of the mixing chambers M5, M4, M3, M2, M1, is provided with ports 46 which communicate with the upper portion of the settling chamber therebeneath, so that the lighter material is progressively fed from each of the settling chambers to the mixer of the chamber next above, as indicated by broken line arrows, and finally to the uppermost chamber S1, from which it passes through an outlet pipe 47 from the extractive plant for proper subsequent treatment.

In each of the mixing chambers a mixture of light and heavy material is discharged through the pipe 43 into the settling chamber corresponding thereto. The heavy material, which is introduced through the pipe 44 into the mixing chamber M1, and thence through the pipe 43 into the settling chamber S1, descends by gravity to the bottom of the chamber, and passes therefrom through an outlet bypass 48 to the mixer M2 of the settling chamber S2 therebeneath, as illustrated by full line arrows. Similarly, the heavy material passes along the bottom of each of the lower settling chambers S2, S3, S4, S5, through similar bypasses to the mixer of the chamber next beneath, and is finally discharged from the lower portion of the settling chamber S6 through a delivery conduit 49.

Each of the settling chambers desirably is provided with a plurality of partitions or baffles 50 and 51, which are spaced apart in such manner as to divide the settling chamber into a plurality of compartments communicating with each other, and serve to divert the descent of particles of the dispersed material and cause coagulation thereof as above described, thereby increasing the rapidity of separation of the heavier material from the light and thereby enabling the size of the settling chamber to be reduced.

While in the above description the base 38 and the partitions 37 are illustrated and described as inclining downwardly toward the circumference of the shell, it is obvious that the same effect would be obtained if the construction shown were inverted so that the partitions would extend upwardly instead of downwardly with the mixing chambers located beneath said partitions instead of superimposed thereupon. In such case the broken and heavy line arrows indicating the direction of flow of the light and heavy materials would be reversed. This may be easily noted by inverting the drawing, Fig. 3.

A further modification of the invention illustrating a convenient manner of forming a duplex-tower of greater capacity is shown in Fig. 4. The construction shown in Fig. 4 is one more economical for plants of large capacity than would be the construction illustrated in Fig. 3, although the actual operation of the two types would differ in no essential detail.

In the construction illustrated in Fig. 4, two series of superimposed settling units of the character above described are employed with mixers having inlets communicating respectively with the bottom and upper portions of two adjacent settling chambers of one series and discharging into a corresponding settling chamber of the other series. In this construction countercurrent flow of the light and heavy materials is maintained, but for structural reasons the separating chambers are arranged in two columns composed of separators which with respect to the flow of heavy material through the system may be designated by alternate numbers. Furthermore, the respective settling chambers are manufactured as identical interchangeable units. In addition, the various mixers are also manufactured as identical interchangeable units. By virtue of this type of construction there arises certain advantages particularly with respect to extraction plants of large capacity. By arrangement of alternate separators in a single column countercurrent flow with respect to a single stage which requires that light material be delivered from one adjacent separator and that heavy material be delivered from the other adjacent separator, is more easily attained. Therefore, the material to be delivered to any one mixer will be drawn from settling chambers which are structurally adjacent in one series each to the other although from the viewpoint of flow through the system they are not consecutive. In this manner the necessary piping and connections are less complicated and more simple of installation. Furthermore, by reducing the separate units of a solvent plant to a few identical and interchangeable units, the actual manufacture of such a plant is simplified and construction costs reduced. The separate units completely assembled may be shop manufactured and after transportation to the desired site may be readily erected with a minimum of field construction. Again, due to the interchangeability of various units, the number of stages of a plant may be easily increased and in case of damage to one or more units, replacement can be readily effected. In addition, by simplification and standardization of the various parts, advantage may be taken of the resulting reduction in engineering and fabrication costs.

As illustrated in Fig. 4, one of the series comprises a suitable base 52 upon which is superimposed a series of preferably identical settling chamber units 53 which may be secured together in any suitable manner as by flanged plates 54 and 55 welded to the sides of adjacent units and having their horizontal flanges secured together by bolts 56 to form a rigid construction.

The other series comprises a base 57 having superimposed thereupon a series of separator chamber units 58 in all respects like the units 53 and secured together in a like manner. Each of the separator units desirably is of the form illustrated in Fig. 1 and may be provided with inclined partitions 59 dividing the same into a series of compartments, the partitions being provided with apertures 60 which are so disposed that the apertures in the several partitions are in staggered arrangement.

In this construction the heavy material is introduced through a pipe 61 into the mixer M1, from which it is discharged through the pipe 62 into the uppermost mixing chamber S1. The lighter material is also drawn from the upper end of the mixing chamber S2 of the other series and mixed with the heavier material is discharged through the pipe 62 into the separator S1 and is discharged from the upper portion of the mixer S1 through the outlet pipe 63.

The heavy material in the settling chamber S1 settles to the bottom of said chamber and passes therefrom through a pipe 64 to the mixer M2. At the same time light material is taken from the upper portion of the separator chamber S3 through a pipe 65 to the mixer M2 and after having been mixed with the heavy material from the chamber S1 is discharged from the mixer M2 through the pipe 65x into the settling chamber S2. Similarly, the heavy material is drawn from the lower portion of the settling chamber S2 through a pipe 66 into the mixer M3 and light material is drawn from the upper portion of the chamber S4 through a pipe 67 to the mixer M3 from which the mixture of light and heavy material is discharged through a pipe 68 to the settling chamber S3. Similarly, denoting a typical mixer between M4 and M12 inclusive as M$n$, light material will be drawn to mixer M$n$ from separator S$n$+1 and heavy material from separator S$n$−1 for any number of separators of the series. In order to provide for the counterflow through the system the light material is introduced through the pipe 69 into the lowermost mixer M13 and finally discharged through the pipe 63 from the uppermost chamber S1, while the heavy material is introduced through the pipe 61 into the mixer M1 and finally discharged from the lowermost chamber S13 of the series through the outlet pipe 72.

It will be obvious that the embodiments of the invention specifically described herein are of an illustrative character and that various changes in construction and arrangement may be made within the spirit and scope of the following claims. For example, it may be mentioned that four series of superimposed settling chambers may be employed and the settlers so staggered with respect to relative arrangement that the heavy material drawn from S$n$+1 and the light material drawn from S$n$−1 to mixer M$n$ may be delivered at the same level thereby resulting in further simplification of the necessary connections.

Having thus described the invention, what is claimed as new, and desired to be secured by Letters Patent, is:

1. Apparatus for refining hydrocarbons by selective solvent action comprising a settling chamber having straight vertical walls, means for introducing into said chamber a mixture of said hydrocarbons and a solvent selectively dissolving certain constituents thereof to form oil and solvent phases of different densities one of which is a dispersed phase, a plurality of narrowly spaced baffle walls within said chamber having a minimum inclination to the horizontal consistent with the free movement of the separated phases acting so to divert the direction of flow of the droplets of the dispersed phase as to facilitate rapid accumulation and coagulation thereof, and means for separately delivering the respective phases from upper and lower portions of said chamber.

2. Apparatus for refining a petroleum substance by selective solvent action comprising a settling chamber having straight vertical walls, means for introducing into said chamber a mixture of said substance and a solvent selectively dissolving certain constituents thereof to form oil and solvent phases of different densities one of which is a dispersed phase, a vertical series of narrowly spaced baffle walls having a minimum inclination to the horizontal consistent with the free movement of the separated phases and dividing the chamber into a plurality of communicating compartments of small height, said baffle walls having apertures arranged to change the direction of gravitational flow of the respective phases and acting to release such particles of one phase as may be entrained in the other, and means for delivering the respective phases from the upper and lower portions of said chamber.

3. Apparatus for refining a petroleum substance by selective solvent action comprising a settling chamber having straight vertical walls, means for introducing into said chamber a mixture of said substance and a solvent selectively dissolving certain constituents thereof to form oil and solvent phases of different densities one of which is a dispersed phase, said chamber having narrowly spaced baffle walls acting so to divert the direction of flow of the droplets of the dispersed phase as to produce rapid accumulation and coagulation thereof, and discharge pipes having legs communicating respectively with the top and bottom portions of said chamber separately delivering the respective phases from said chamber and so arranged as to form a trap, the effective legs of which are of such relative height that delivery of the quantity of each phase produced will be automatically and continuously effected.

4. Apparatus for refining a petroleum substance by selective solvent action comprising a settling chamber having vertical walls, means for introducing into said chamber a mixture of said substance and a solvent selectively dissolving certain constituents thereof to form oil and solvent phases of different densities one of which is a dispersed phase, a plurality of narrowly spaced parallel baffle walls inclined to the horizontal within said chamber providing a series of communicating settling compartments of vertical heights small in comparison with the other dimensions of the chamber by means of which the vertical distance through which a settling particle must pass before encountering other particles under conditions which will accelerate coagulation will be decreased, said compartments communicating with straight vertical passageways separately delivering the respective phases from the upper and lower portions of the chamber.

5. Apparatus for refining a petroleum substance by selective solvent action comprising a settling chamber having vertical walls, means for introducing into said chamber a mixture of said substance and a solvent selectively dissolving certain constituents thereof to form oil and solvent phases of different densities one of which is a dispersed phase, a plurality of inclined narrowly spaced parallel baffle walls inclined to the horizontal and terminating short of the end walls thereof to provide straight vertical passageways and a series of settling compartments communicating therewith of vertical height small in comparison with other dimensions of the chamber by means of which the vertical distance through which a settling particle must pass before encountering other like particles will be decreased, means for separately delivering the respective phases from the upper and lower portions of the chamber comprising conduits for the respective phases communicating respectively with said passageways at the upper and lower portions of the settling chamber and of proper cross sectional area to permit unrestricted flow of said phases but not to excessively increase the hold-up of the solvent.

6. Apparatus for refining hydrocarbons by selective solvent action comprising a series of mixers and a vertical series of complementary superimposed settling chamber units having straight vertical walls, means for supplying hydrocarbon to the mixer at one end of said series, means for supplying solvent to the mixer at the other end of said series, means for delivering the oil phase and solvent phase to each mixer and the mixture thereof to the complementary settling chamber in such manner as to maintain a true countercurrent flow by gravitational forces, baffle walls in each settling chamber having a minimum inclination to the horizontal consistent with the free movement of the separated phases acting so to divert the direction of flow of the droplets of the dispersed phase as to produce rapid accumulation and coagulation thereof, and means for delivering one phase from the upper end of said series and the other phase from the lower end thereof.

7. Apparatus for refining hydrocarbons by selective solvent action comprising a series of settling chambers arranged in a plurality of columns with the settling chambers of said series alternating in the respective columns, a power actuated mixer complementary to each of said settling chambers having inlets communicating respectively with the bottom and upper portions of two adjacent settling chambers in the same column, and a discharge outlet communicating with its complementary settling chamber of another column, means for introducing the hydrocarbon at one end of said series, means for introducing the solvent at the other end of said series of settling chambers, and means for delivering the lighter phase from the uppermost of said series and the heavier phase from the lowermost of said series.

8. Apparatus for refining hydrocarbons by selective solvent action comprising a series of settling chambers arranged in two columns with the settling chambers of said series alternating in the respective columns, a power actuated mixer complementary to each of said settling chambers having inlets communicating respectively with the bottom and upper portions of two adjacent settling chambers in the same column, and a discharge outlet communicating with its complementary settling chamber of another column, means for introducing the heavier material into the mixer having an inlet communicating with the upper portion of the upper settling chamber of one column, means for introducing the lighter material into the mixer having an inlet communicating with the bottom of the lowermost settling chamber of the same column, and means for discharging the lighter and heavier phases respectively from the top of the uppermost and the bottom of the lowermost separators of the other column.

9. Apparatus for refining hydrocarbons by selective solvent action comprising a series of settling chambers arranged in a plurality of columns with the settling chambers of said series alternating in the respective columns, a mixer complementary to each of said settling chambers having inlets communicating respectively with the bottom and upper portions of two adjacent settling chambers in the same column, and a discharge outlet communicating with its complementary settling chamber of another column, means for introducing the hydrocarbon at one end of said series, means for introducing the solvent at the other end of said series of settling chambers, means for delivering the lighter phase from the uppermost of said series and the heavier phase from the lowermost of said series, and baffle walls in each of said settling chambers inclined to the horizontal and terminating short of the ends of said chambers dividing the respective chambers into communicating compartments of relatively short height and acting to facilitate coagulation of the descending droplets of the dispersed material.

10. Apparatus for refining hydrocarbons by selective solvent action comprising a series of settling chambers arranged in a plurality of columns with the settling chambers of said series alternating in the respective columns, a mixer complementary to each of said settling chambers having inlets communicating respectively with the bottom and upper portions of two adjacent settling chambers in the same column, and a discharge outlet communicating with its complementary settling chamber of another column, means for introducing the hydrocarbon at one end of said series, means for introducing the solvent at the other end of said series of settling chambers, means for delivering the lighter phase from the uppermost of said series and the heavier phase from the lowermost of said series, a plurality of baffle walls in each settling chamber inclined to the horizontal and terminating short of the ends of said chamber dividing the respective settling chambers into a plurality of compartments of relatively short height acting to facilitate coagulation of descending droplets of dispersed material, said baffle walls being provided with apertures in vertically staggered arrangement and acting to facilitate the release from the heavier material passing therethrough of such lighter material as is entrained therein.

11. Apparatus for refining hydrocarbons by selective solvent action comprising a settling chamber, within said chamber a plurality of narrowly spaced baffle walls having a minimum inclination from the horizontal consistent with the free movement of fluids present, means for delivering at a plurality of points between different pairs of baffle walls a mixture of said hydrocarbons and a solvent selectively dissolving certain constituents thereof to form oil and solvent phases of different densities, and means for separately delivering the respective phases from the upper and lower sections of said chamber.

12. Apparatus for refining a petroleum substance by selective solvent action comprising a settling chamber having straight essentially vertical walls, a plurality of narrowly spaced baffle walls inclined to the horizontal within said chamber providing a series of communicating settling compartments, means for delivering at a plurality of points between different pairs of said baffle walls intermediate of their lengths a mixture of said substance and a solvent selectively dissolving certain constituents thereof to form oil and solvents phases of different densities, said compartments communicating with essentially vertical passageways separately delivering the respective phases from the upper and lower portions of the settling chamber.

13. Apparatus for refining a petroleum substance by selective solvent action comprising a settling chamber having straight essentially vertical walls, a plurality of narrowly spaced baffle walls having essentially horizontal slots and inclined to the horizontal within said chamber providing a series of communicating settling compartments, means for delivering at a plurality of points between different pairs of said baffle walls intermediate of their lengths a mixture of said substance and a solvent selectively dissolving certain constituents thereof to form oil and solvent phases of different densities, said compartments communicating with essentially vertical passageways separately delivering the respective phases from the upper and lower portions of the settling chamber.

14. Apparatus for refining hydrocarbons by selective solvent action comprising a settling chamber having straight vertical walls, means for introducing into the chamber a mixture of said hydrocarbons and a solvent selectively dissolving certain constituents thereof to form oil and solvent phases of different densities one of which is a dispersed phase, a plurality of narrowly spaced baffle walls provided with essentially horizontal slots within said chamber having a minimum inclination to the horizontal consistent with a free movement of the separated phases acting so to divert the direction of flow of the droplets of the dispersed phase as to facilitate rapid accumulation and coagulation thereof, and means for separately delivering the respective phases from upper and lower portions of said chamber.

15. Apparatus for refining hydrocarbons by selective solvent action comprising a settling chamber, a plurality of narrowly spaced baffle walls within said chamber having a minimum inclination from the horizontal consistent with the free movement of fluids present and providing a series of settling compartments, means for delivering between different pairs of baffle walls a mixture of said hydrocarbons and a solvent selectively dissolving certain constituents thereof to form oil and solvent phases of different densities, essentially vertical passageways connecting with opposite portions of said settling compartments into and through which the respective phases flow, and means communicating with said passageways for separately delivering the respective phases from the upper and lower sections of said chamber.

16. Apparatus for refining hydrocarbons by selective solvent action comprising a settling chamber, a plurality of narrowly spaced baffle walls within said chamber having a minimum inclination from the horizontal consistent with the free movement of fluids present and providing a series of settling compartments, said baffle walls having spaced slots, the slots in adjacent walls being arranged in staggered relationship, means for delivering between different pairs of baffle walls a mixture of said hydrocarbons and a solvent selectively dissolving certain constituents thereof to form oil and solvent phases of different densities, essentially vertical passageways connecting with opposite portions of said settling compartments into and through which the respective phases flow, and means communicating with said passageways for separately delivering the respective phases from the upper and lower sections of said chamber.

17. Apparatus for refining hydrocarbons by selective solvent action comprising a series of mixers and a vertical series of complementary superimposed settling chamber units, means for supplying hydrocarbon to the mixer at one end of said series, means for supplying solvent to the mixer at the other end of said series, means for delivering the oil and solvent phases to each mixer and the mixture of said said phases to the complementary settling chamber in such manner as to maintain a true counter-current flow by gravitational forces, baffle walls in each settling chamber providing a series of settling compartments and having a minimum inclination to the horizontal consistent with the free movement of the separated phases and acting so to divert the direction of flow of the droplets of the dispersed phase as to produce rapid accumulation and coagulation thereof, essentially vertical passageways connecting with opposite portions of said settling compartments into and through which the respective phases flow, and means for delivering one phase from the upper end of said series and the other phase from the lower end thereof.

18. Apparatus for refining hydrocarbons by selective solvent action comprising a series of vertically disposed settling chambers, each having a mixer associated therewith, means for supplying hydrocarbon to the mixer at one end of said series, means for supplying solvent to the mixer at the other end of said series, means for delivering the oil phase to the mixer associated with one of the settling chambers from a chamber disposed thereabove, means for delivering the solvent phase to said last mentioned mixer from a chamber disposed therebelow, means for delivering the mixture of the two phases from said last mentioned mixer to the settling chamber with which it is associated, the arrangement being such as to maintain counter-current flow of the phases by gravitational forces, baffle walls in each settling chamber providing a series of settling compartments and having a minimum inclination to the horizontal consistent with the free movement of the separated phases and acting so to divert the direction of flow of the droplets of the dispersed phase as to produce rapid accumulation and coagulation thereof, essentially vertical passageways connecting with opposite portions of said settling compartments into and through which the respective phases flow, and means for delivering one phase from the upper end of said series and the other phase from the lower end thereof.

JOHN W. POOLE.